(12) United States Patent
Hidaka et al.

(10) Patent No.: US 11,435,560 B2
(45) Date of Patent: Sep. 6, 2022

(54) LENS SUBSTRATE STACKING POSITION CALCULATING APPARATUS AND PROGRAM

(71) Applicant: MITUTOYO CORPORATION, Kanagawa (JP)

(72) Inventors: Kazuhiko Hidaka, Tokyo (JP); Hiromu Maie, Ibaraki (JP); Jyota Miyakura, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 387 days.

(21) Appl. No.: 16/789,970

(22) Filed: Feb. 13, 2020

(65) Prior Publication Data
US 2020/0271901 A1 Aug. 27, 2020

(30) Foreign Application Priority Data
Feb. 22, 2019 (JP) .............................. JP2019-031073

(51) Int. Cl.
*G02B 13/00* (2006.01)
*G02B 3/00* (2006.01)
*H04N 5/225* (2006.01)

(52) U.S. Cl.
CPC ....... *G02B 13/0085* (2013.01); *G02B 3/0012* (2013.01); *G02B 3/0062* (2013.01); *H04N 5/2254* (2013.01)

(58) Field of Classification Search
CPC .............. G02B 13/0085; G02B 3/0012; G02B 3/0062; G02B 27/0012; H04N 5/2257; G01B 5/06; G01B 7/06; G01B 11/24
See application file for complete search history.

(56) References Cited

U.S. PATENT DOCUMENTS 9,638,883 B1 * 5/2017 Duparre ............. G02B 13/0085
2017/0038552 A1 2/2017 Georgiev

FOREIGN PATENT DOCUMENTS

JP 2014-4727 1/2014
JP 2018-523850 8/2018
WO WO-2017022189 A1 * 2/2017 ....... B29D 11/00307

* cited by examiner

*Primary Examiner* — Alicia M Harrington
(74) *Attorney, Agent, or Firm* — Greenblum & Bernstein, P.L.C.

(57) ABSTRACT

The present invention provides a lens substrate stacking position calculating apparatus capable of calculating a stacking position at which the number of lens sets whose optical axis deviation falls within an allowable range is maximized, when a plurality of wafer lens arrays are bonded together even if the position of each lens formed on a wafer substrate is deviated between wafer lens arrays to be stacked. The lens substrate stacking position calculating apparatus calculates the positional relationship of two or more transparent substrates to be stacked when the two or more transparent substrates on which a plurality of lenses are two-dimensionally arranged are stacked to form a plurality of lens sets each including two or more lenses. A position of each lens is specified in advance in a common coordinate system.

16 Claims, 3 Drawing Sheets

LENS SUBSTRATE STACKING POSITION CALCULATING APPARATUS AND PROGRAM

CROSS-REFERENCE TO RELATED APPLICATION

This non-provisional application claims priority under 35 U.S.C. § 119(a) from Japanese Patent Application No. 2019-031073, filed on Feb. 22, 2019, the entire contents of which are incorporated herein by reference.

BACKGROUND

Technical Field

The present invention relates to a lens substrate stacking position calculating apparatus and a program capable of suppressing occurrence of optical axis deviation of a stacked lens when the stacked lens is manufactured by stacking substrates on which a large number of lenses are formed and singulating the stacked lens.

Background Art

Recently, as a camera module used for smartphones and the like, a WLCM (Wafer Level Camera Module) using a WLO (Wafer Level Optics) technique has attracted attention.

The WLO technique is a technique of manufacturing a plurality of wafer lens arrays in which a plurality of lenses are two-dimensionally arranged on a transparent wafer substrate in the same lens array, stacking and sticking them, and singulating lens sets at the same arrangement positions, thereby manufacturing a plurality of stacked lenses. The WLCM, which applies WLO technology, is a camera module which is manufactured by bonding a plurality of wafer lens arrays together with a wafer on which large number of image sensors are formed and singulating them into individual pieces. WLCM can be expected to be smaller in size, higher in performance, and lower in manufacturing costs of cameras, as compared with camera modules manufactured by conventional manufacturing methods.

In the manufacturing process of the multilayer lens and the camera module by the WLO technique, if there is a positional deviation at the time of stacking and bonding the wafer lens arrays, an optical axis deviation occurs between the lenses constituting the lens set at the same arrangement position, and there is a possibility that the optical performance of the manufactured multilayer lens and the camera module is remarkably deteriorated.

In order to prevent the occurrence of such a problem, various methods for bonding a plurality of wafer lens arrays with high accuracy have been proposed (see, for example, Japanese Patent Laid-Open No. 2014-4727 and Japanese Patent Laid-Open No. 2018-523850).

SUMMARY OF THE INVENTION

Problems to be Solved by the Invention

In a conventional method of bonding a plurality of wafer lens arrays disclosed in Japanese Patent Laid-Open No. 2014-4727 and Japanese Patent Laid-Open No. 2018-523850, bonding is performed with reference to an alignment mark provided on each wafer substrate. In such a bonding method, it is assumed that the positions at which the lenses are formed with respect to the alignment marks are the same for all the wafers.

However, when the positions at which the respective lenses are formed with respect to the alignment marks provided on the wafer substrate are deviated between the wafer lens arrays to be bonded, there is a possibility that the optical axes deviate between the lenses constituting the lens set of the same arrangement position, and the deviation may exceed the allowable range.

For example, FIG. 4B shows a plan view in which two wafer substrates W1 and W2 shown in FIG. 4A having a deviation in the formation position of each lens L with respect to the alignment mark are bonded together with the spacer S interposed therebetween with the alignment mark as a reference. FIG. 4C shows a cross-sectional view taken along line A-A in FIG. 4B.

As can be seen from the drawing 4C, in this example, the optical axes of the lens sets at the left and right ends are largely deviated, and if the deviation amounts are outside the allowable ranges, the it cannot be shipped as a product, which leads to a decrease in yield.

It is an object of the present invention to provide a lens substrate stacking position calculating apparatus and a program capable of calculating a stacking position at which the number of lens sets whose optical axis deviation falls within an allowable range is maximized, when a plurality of wafer lens arrays are bonded together even if the position of each lens formed on a wafer substrate is deviated between wafer lens arrays to be bonded.

Means for Solving the Problems

A lens substrate stacking position calculating apparatus of the present invention calculates a positional relationship of two or more transparent substrates to be stacked when the two or more transparent substrates on which a plurality of lenses are two-dimensionally arranged are stacked to form a plurality of lens sets each including two or more lenses. The position of each lens is specified in advance in a common coordinate system. The lens substrate stacking position calculating apparatus includes a positional relationship calculating unit for calculating a relative positional relationship between two or more transparent substrates that maximizes the number of lens sets in which the magnitude of the positional deviation between the lenses constituting the lens set falls within a predetermined range by a predetermined calculation method.

The positional relationship calculating unit may calculate the relative positional relationship between two or more transparent substrates in which the number of lens sets in which the magnitude of the positional deviation between the lenses constituting the lens set falls within a predetermined range is larger than the predetermined number by a predetermined calculating method.

The common coordinate system may be a two-dimensional coordinate system commonly defined for each transparent substrate.

When the common coordinate system is a two-dimensional coordinate system, the two-dimensional coordinate system may be defined based on an alignment mark provided on the transparent substrate.

The relative positional relationship between the two or more transparent substrates may be amounts shifted the rotational direction and the translational direction, respectively.

As the predetermined calculation method of the relative positional relation between two or more transparent substrates, a random search method or a RANSAC method may be employed.

The lens substrate stacking position calculating apparatus may further comprise a lens position specifying unit for specifying a position of each lens based on three-dimensional shape data of a predetermined range of the lens surface.

The lens position specifying unit may fit a predetermined three-dimensional model to the three-dimensional shape data. The lens position specifying unit may specify the two-dimensional coordinates of the center point of the three-dimensional model after fitting in the two-dimensional coordinate system as the position of the lens on the transparent substrate.

The predetermined three-dimensional model may be a sphere, and a predetermined center point may be calculated based on an equation of a spherical surface.

The predetermined three-dimensional model may be a design data of the lens, and the predetermined center point may be calculated based on a calculation formula based on the design data.

The lens substrate stacking position calculating apparatus may further comprise a shape measuring unit for measuring three-dimensional shape data.

The lens substrate stacking position calculating apparatus of the present invention may be realized by executing a program in which the functions of the respective units are described by a computer.

Effect of the Invention

According to the lens substrate stacking position calculating apparatus of the present invention, even if the positions of the plurality of lenses formed on the respective wafer substrates are deviated between the wafer lens arrays to be bonded when two or more wafer lens arrays are bonded, the relative positional relationship of the two or more wafer lens arrays in which the magnitude of the positional deviation between the lenses constituting the lens set, that is, the number of the lens sets in which the magnitude of the optical axis deviation falls within a predetermined range is the maximum can be calculated by a predetermined calculating method, whereby the yield of the product can be improved.

DETAILED DESCRIPTION OF THE EMBODIMENTS

Figure 1:
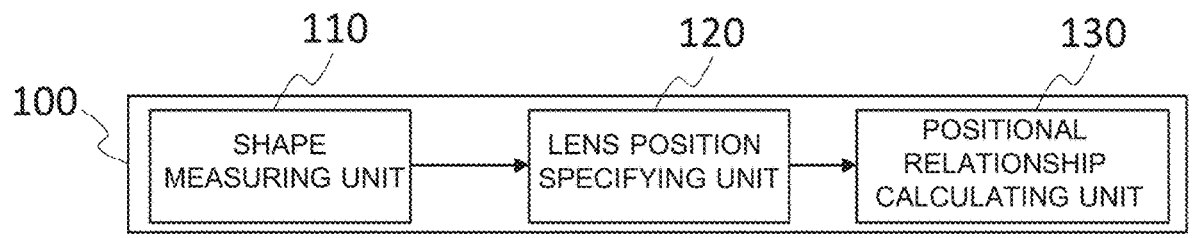
FIG. 1 is a functional block diagram of a lens substrate stacking position calculating apparatus 100.

Embodiments of the present invention will be described below with reference to the drawings. In the following description and the drawings, the same functional units are denoted by the same reference numerals, and the description of the functional units once described is omitted or limited to the extent necessary.

The lens substrate stacking position calculating apparatus of the present invention calculates a positional relationship in which two or more wafer substrates are bonded together when the two or more transparent wafer substrates in which a plurality of lenses are formed in a predetermined arrangement are stacked to form a plurality of lens sets each including two or more lenses.

FIG. 1 is a functional block diagram of a lens substrate stacking position calculating apparatus 100 according to the present invention. The lens substrate stacking position calculating apparatus 100 includes a shape measuring unit 110, a lens position specifying unit 120, and a positional relationship calculating unit 130.

The shape measuring unit 110 measures three-dimensional shape data of a predetermined range of the lens surface for each lens constituting a wafer lens array in which a plurality of lenses are two-dimensionally arranged on a transparent wafer substrate.

The shape measuring unit 110 measures the three-dimensional coordinates of each of a plurality of points appropriately selected within a predetermined range of the lens surface with a predetermined origin as a reference, and outputs a set of three-dimensional coordinates of the plurality of points obtained thereby as three-dimensional shape data of the lens.

The measurement of the three-dimensional shape data in the shape measuring unit 110 is performed in order to obtain measurement data used for the determination of the position of the lens performed in the lens position specifying unit 120. Therefore, the measurement of the three-dimensional shape of the lens surface may be performed at least in a range for which the measurement data is required in the lens position specifying method employed by the lens position specifying unit 120.

The shape measuring unit 110 may employ an arbitrary three-dimensional shape measuring device as long as it can collect three-dimensional shape data of a predetermined range of the lens surface.

Figure 2A:
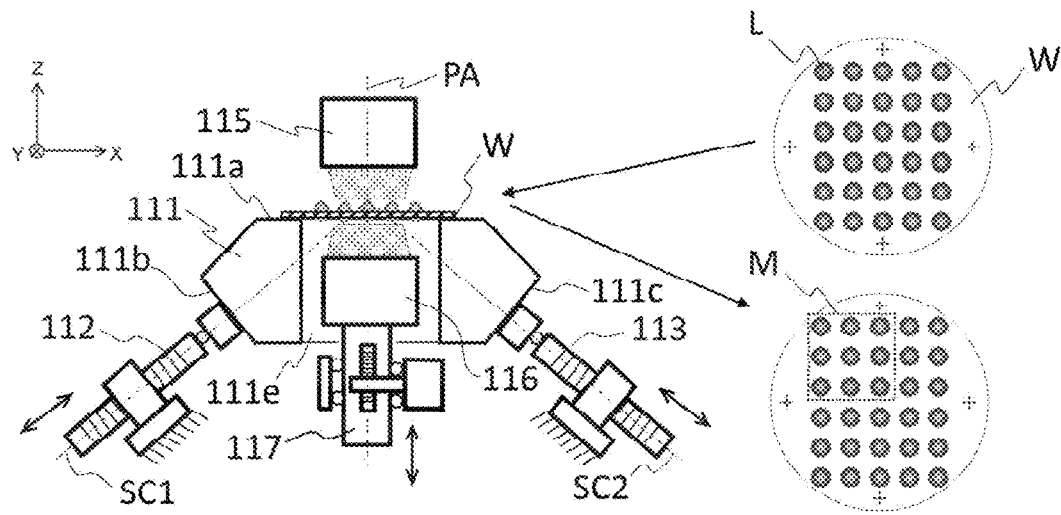
FIG. 2A and FIG. 2B are diagrams showing examples of the configuration of the shape measuring unit 110.
Figure 2B:
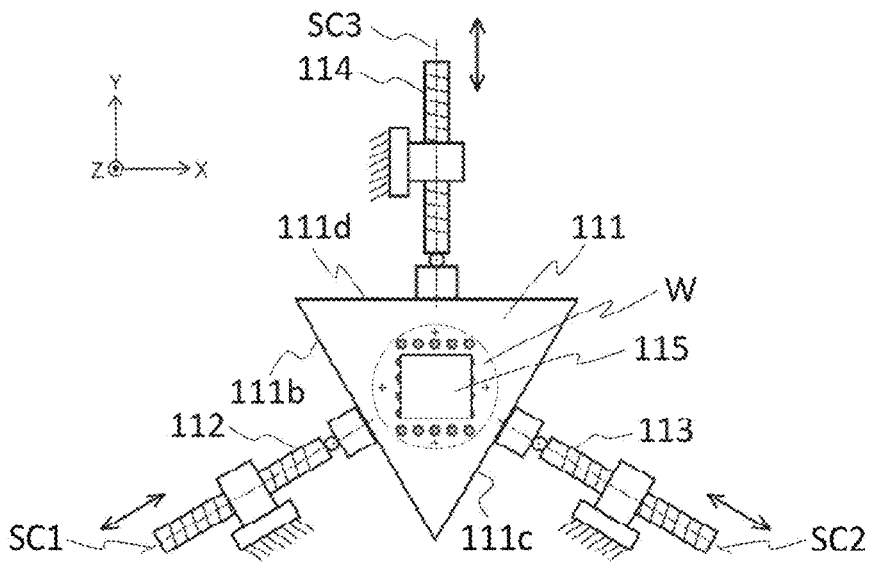

FIG. 2A and FIG. 2B show examples of the configuration of the shape-measuring unit 110. FIG. 2A is a schematic cross-sectional view, and FIG. 2B is a schematic plan view.

The shape measuring unit 110 includes a movable body 111 having a mounting portion 111a on which a wafer substrate W is mounted, and a first surface 111b, a second surface 111c, and a third surface 111d which are not coplanar with each other. The mounting portion 111a is provided on the upper surface of the movable body 111. A first surface 111b, a second surface 111c, and a third surface 111d, which are different from each other in the normal direction, are provided on the lower side of the movable body 111. The normal directions of the first surface 111b, the second surface 111c, and the third surface 111d need not be orthogonal to each other. Each of the first surface 111b, the second surface 111c, and the third surface 111d is provided so as to face downward.

The movable body 111 is movable in the X, Y, and Z directions by the respective forward and backward movement of the first advancing/retracting unit 112, the second advancing/retracting unit 113, and the third advancing/retracting unit 114, respectively, based on the drive control by the drive control unit (not shown) Each of the first advancing/retracting unit 112, the second advancing/retracting unit 113, and the third advancing/retracting unit 114 has a linear scale.

The first advancing/retracting unit 112 has a pressing surface at one end for pressing the first surface 111b, and detects a first scale position indicating an advancing/retracting amount with respect to a reference position in accordance with advancing/retracting along a first advancing/retracting axial SC1 that is parallel to a normal line direction of the first surface 111b. That is, the linear scale in the first advancing/retracting section 112 is arranged along the first advancing/retracting axial SC1. The pressing surface of the first advancing/retracting portion 112 is not fixed to the first surface 111b, but is provided so as to be slidable along the first surface 111b.

The second advancing/retracting unit 113 has a pressing surface at one end for pressing the second surface 111c, and detects a second scale position indicating the advancing/retracting amount with respect to the reference position in accordance with the advancing/retracting along the second advancing/retracting axial SC2 that is parallel to the normal direction of the second surface 111c. That is, the linear scale in the second advancing/retracting section 113 is arranged along the second advancing/retracting axial SC2. The pressing surface of the second advancing/retracting unit 113 is not fixed to the second surface 111c, but is provided so as to be slidable along the second surface 111c.

The third advancing/retracting unit 114 has a pressing surface at one end for pressing the third surface 111d, and detects a third scale position indicating an advancing/retracting amount with respect to the reference position in accordance with advancing/retracting along the third advancing/retracting shaft SC3 that is parallel to the normal line direction of the third surface 111d. That is, the linear scale in the third advancing/retracting section 114 is arranged along the third advancing/retracting axial SC3. The pressing surface of the third advancing/retracting portion 114 is not fixed to the third surface 111d, but is provided so as to be slidable along the third surface 11d.

In the shape measuring unit 110, the first advancing/retracting axis SC1, the second advancing/retracting axis SC2, and the third advancing/retracting axis SC3 are provided so as to intersect at one point above the movable body 111. A first probe 115 is provided above the wafer substrate W.

Although the first probe 115 may be a contact type or a non-contact type, it is assumed that the first probe is a non-contact type in the present embodiment. The type of non-contact sensor is arbitrary and may employ, for example, white light interferometers, structured illumination microscopy, instantaneous phase shift interferometers, holographic interferometers, and the like. By employing the non-contact type, it becomes possible to collectively measure the surface shapes of a plurality of lenses L existing in a predetermined range on the wafer substrate W.

The center of the tip of the first probe 115 serves as a reference point for position measurement. This reference point is located on the probe axis PA parallel to the Z direction, and is located at the intersection of the first advancing/retracting axis SC1, the second advancing/retracting axis SC2, and the third advancing/retracting axis SC3. In this manner, the reference point of the position measurement of the first probe 115 is set to the intersection of the first advancing/retracting axis SC1, the second advancing/retracting axis SC2, and the third advancing/retracting axis SC3, whereby the high-precision position measurement using the reference point of the first probe 115 as a reference in accordance with Abbe's principles can be performed.

A second probe 116 may be further provided below the wafer substrate W. The second probe 116 may be of any type regardless of the contact type or the non-contact type.

The second probe 116 measures the probe position, which is the position along the probe axis PA. The second probe 116 is provided so as to be movable along the probe axis PA. The position of the center portion of the distal end of the second probe 116 along the probe axis PA is measured by the probe scale portion 117. The probe scale unit 117 includes a linear scale arranged along the probe axis PA. The movable body 111 is provided with a through hole 111e, and the second probe 116 is provided in a form inserted into the through hole 111e.

Owing to providing the second probe 116, when a lens is also formed on the back surface of the wafer substrate W, the position of the lens provided on the back surface of the wafer substrate W can be easily measured by the second probe 116 through the through hole 111e.

In the shape measuring unit 110 having such a configuration, the first advancing/retracting unit 112, the second advancing/retracting unit 113, and the third advancing/retracting unit 114 are driven to advance/retreat, and the balance of the advancing/retreating is controlled, whereby the movable body 111 can be moved in the respective directions of X, Y, and Z by an arbitrary amount.

For example, by adjusting the detection range of the first probe 115 to an arbitrary measurement region M of a lens on the front side of the wafer substrate W, three-dimensional shape data of a predetermined range of each lens included in the measurement region M can be obtained based on the first scale position, the second scale position, and the third scale position. By repeating this measurement while moving the measurement region, three-dimensional shape data in a predetermined range can be obtained for all the lenses L on the wafer substrate W.

Further, when the second probe 116 is provided, it is possible to obtain three-dimensional coordinate values in a predetermined range of each lens included in the measurement region on the back side of the wafer substrate W based on the probe position of the second probe 116.

The lens position specifying unit 120 specifies, for each lens L constituting the wafer substrate W, a position of the lens L in a predetermined coordinate system based on three-dimensional shape data of a predetermined range of the surface of the lens L obtained by the shape measuring unit 110.

The predetermined coordinate system may be a two-dimensional coordinate system or a three-dimensional coordinate system. In the following description, it is assumed that a two-dimensional coordinate system commonly defined for each wafer substrate W to be superimposed is a predetermined coordinate system.

A method of commonly defining a two-dimensional coordinate system for each wafer substrate W to be superimposed is arbitrary. For example, the two-dimensional coordinate system may be defined based on an alignment mark provided on the wafer substrate.

The method of specifying the position of the lens L based on the three-dimensional shape data of the lens L in the two-dimensional coordinate system defined on the wafer substrate W in the lens position specifying unit 120 is arbitrary.

For example, a predetermined three-dimensional model may be fitted to the three-dimensional shape data of the lens L, and the two-dimensional coordinates of the predetermined center point of the three-dimensional model after fitting may be specified as the position of the lens L.

In the case where the lens L is a spherical lens, by fitting the three-dimensional model of the sphere to the three-dimensional shape data of the lens L, the two-dimensional coordinates of the center point can be calculated based on the equation of the spherical surface.

Alternatively, the design data of the lens L may be fitted to the three-dimensional shape data of the lens L, and the two-dimensional coordinates of the center point may be calculated by a calculation formula based on the design data.

The positional relationship calculating unit 130 calculates a relative positional relationship between two or more wafer substrates W that maximizes the number of lens sets in which the magnitude of the positional deviation between the lenses constituting the lens set falls within a predetermined range by a predetermined calculating method. Here, the two or more lens sets are formed by stacking two or more wafer substrates W on which two or more lenses L whose positions in the common two-dimensional coordinate system are respectively specified by the lens position specifying unit 120 are formed. The lenses constituting each lens set are in the same arrangement position of the corresponding wafer substrates with one another.

The calculation method of the relative positional relationship between two or more transparent substrates is arbitrary. For example, a random search method or a RANSAC method can be employed. In the random search method and the RANSAC method, the relative positional relation between two or more wafer substrates W is defined as amounts shifted in the rotational direction and the translational direction.

An outline of calculation algorithms by the random search method and the RANSAC method will be described. For the sake of clarity, the case where two wafer substrates W1 and W2 are bonded to each other will be described as an example. In the case of three or more sheets, the calculation can be performed by a similar algorithm.

Assume that N lenses L are formed on the wafer substrates W1 and W2, respectively, the coordinates of each lens L on the wafer substrate W1 are Wai (i=1, 2, ..., N), and the coordinates of each lens L on the wafer substrate W2 are Wbi (i=1, 2, ..., N).

Hereinafter, the rotation matrix R and the translation vector T are obtained as the shift amount of the two wafer substrates W, where the allowable value of the optical axis shift amount between the two lenses L constituting the lens set after bonding, i.e., the positional shift amount in the direction along the plane, is TH. In the calculation, when the alignment is performed in two-dimension of translation and rotation along the plane of the wafer, the number of parameters of the rotation matrix R is 1 and the number of parameters of the translation vector T is 2. When alignment is performed in three-dimension by adding an inclination of the surface of the wafer, the number of parameters of the rotation matrix R and the number of parameters of the translation vector T are both 3. The rotation matrix R and the translation vector T can be calculated by the same method in the two-dimensional case or the three-dimensional case. Hereinafter, for the sake of clarity of description, a case of alignment in two-dimension will be described as an example.

Parameters representing the rotation matrix R and the translation vector T in the two-dimensional case are denoted by p1, p2, and p3.

In the case of the random search method, the calculation is performed by the following procedure.

(1) Least squares fitting is performed on Wa1, Wb1/Wa2, Wb2/.../WaN, WbN to obtain initial values ini_p1, ini_p2 and ini_p3 of p1, p2 and p3, respectively. Further, the rotational matrix R and the translation vector T corresponding to the initial values are iniR, iniT, respectively.

(2) The following formula is used as a criterion formula, and number of combinations VaIN of lenses satisfying the criterion formula is obtained.

$$|Wai - iniR \times Wbi - iniT| < TH$$

(3) Using the random number dp1, dp2, dp3, np1, np2, np3 are obtained from the following formula.

$$Np1 = ini\_p1 + dp1$$

$$Np2 = ini\_p2 + dp2$$

$$Np3 = ini\_p3 + dp3$$

(4) The rotational matrix R and the translation vector T corresponding to the np1, np2, np3 are denoted by nR and nT, respectively, and number of combinations nVaIN of lenses that satisfy the following criterion formula is calculated.

$$|Wai - nR \times Wbi - nT| < TH$$

(5) For nVaIN>VaIN, the values p1=np1, p2=np2, and p3=np3 are saved temporarily as candidates for optimal values.

(6) The values p1, p2, and p3 obtained when the above steps (3) to (5) are repeated a predetermined number of times are regarded as the optimum values of the bonding positions.

For the RANSAC method, calculate using the following procedures.

(1) Two or more sets are randomly selected from the combinations of Wa1, Wb1/Wa2, Wb2/.../WaN and WbN, and the least squares fitting is performed only on the selected sets. The result is denoted by wp1, wp2, wp3, and the corresponding rotational matrix R and translation vector T are denoted by iniR, iniT.

(2) The following formula is used as a criterion formula, and the VaIN of combinations of lenses satisfying the criterion formula is obtained.

$$|Wai - iniR \times Wbi - iniT| < TH$$

(3) The above steps (1) and (2) are repeated a predetermined number of times, and wp1, wp2, and wp3 when the VaIN is maximized are set as the optimum value of the bonding position.

In any of the calculation methods, it is not essential to calculate the optimum value so that the optical axis deviation is within the allowable range in all the lens sets, and the optimum value may be calculated so that the optical axis deviation is within the allowable range in a specific plurality of sets.

According to the lens substrate stacking position calculating apparatus 100 of the present invention configured as described above, even if the positions of the plurality of lenses formed on the respective wafer substrates are deviated between the wafer lens arrays to be bonded when two or more wafer lens arrays are bonded, the relative positional relationship of the two or more wafer lens arrays in which the number of the lens sets in which the magnitude of the positional deviation between the lenses constituting the lens sets (or the magnitude of the optical axis deviation) falls within a predetermined range is maximized can be calculated by a predetermined calculation method with respect to the plurality of lens sets to be produced. As a result, the yield of the product can be improved.

In any of the calculation methods, the number of lens sets in which the magnitude of the positional deviation between the lenses constituting the lens set falls within a predetermined range is not necessarily the maximum. For example, a positional relationship may be calculated in which a number of lens sets that can secure an allowable yield can be obtained.

Figure 3A:
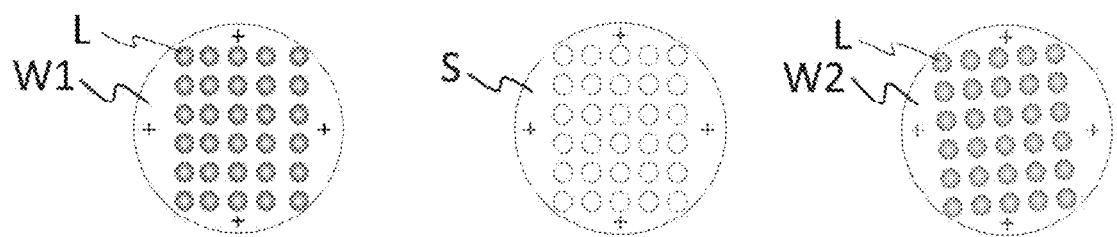
FIGS. 3A to 3C are diagrams illustrating the degree of optical axis deviation when wafer substrates are stacked in a positional relation based on a calculation result by the lens substrate stacking position calculating apparatus 100.
Figure 3B:
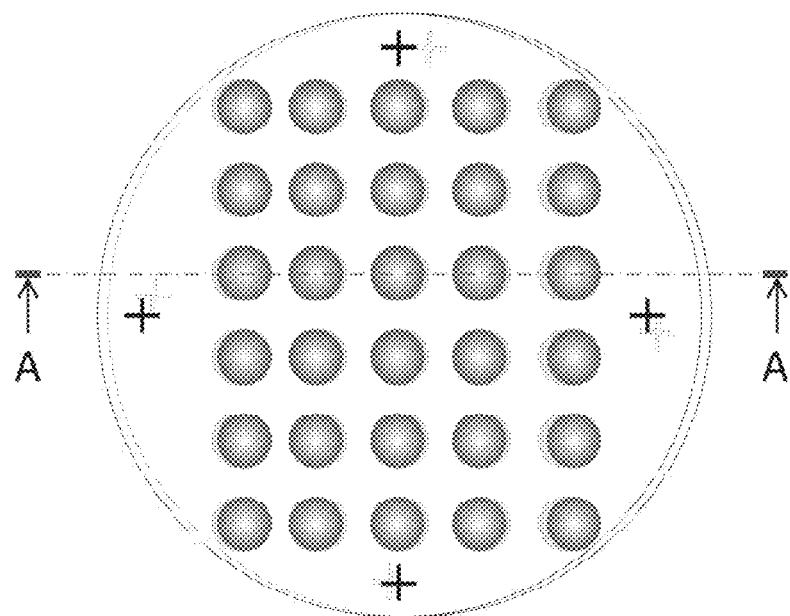
Figure 3C:
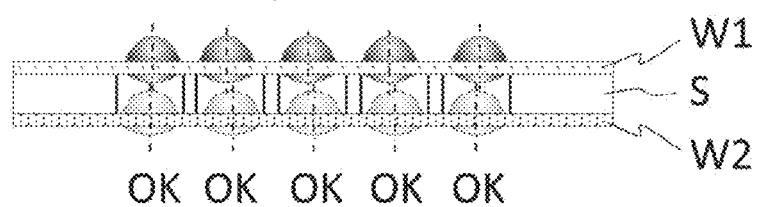
Figure 4A:
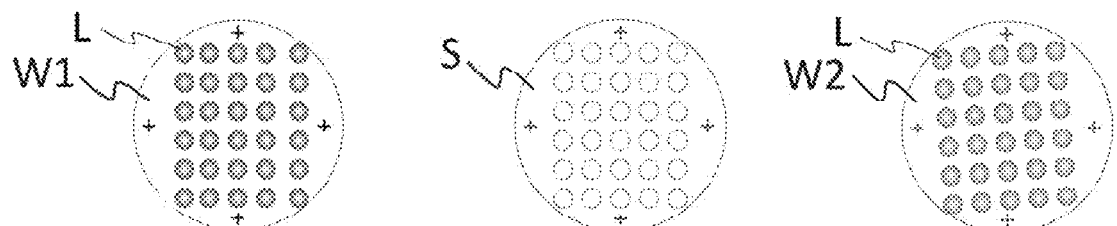
FIGS. 4A to 4C are diagrams illustrating the degree of optical axis deviation when wafer substrates are stacked based on the alignment marks.
Figure 4B:
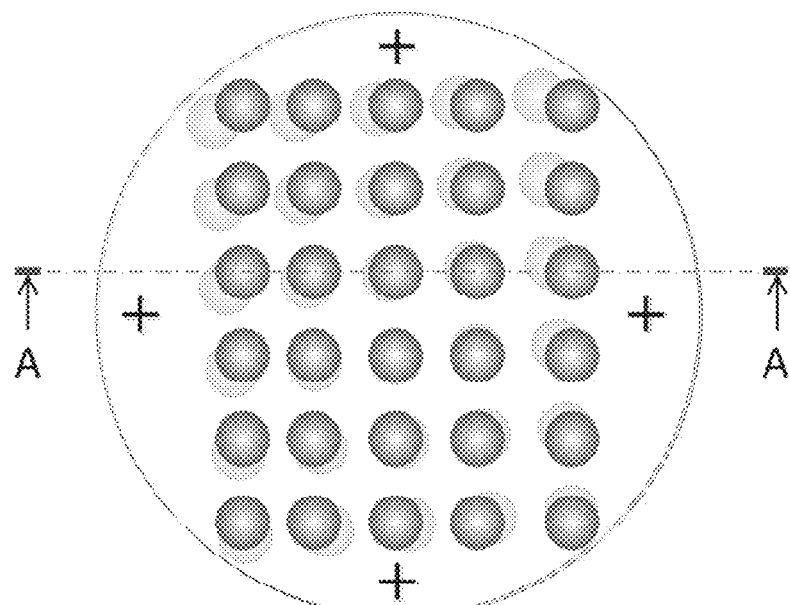
Figure 4C:
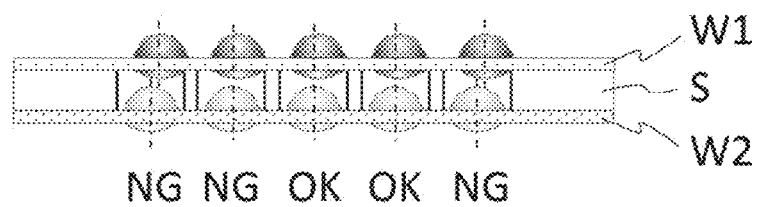

FIG. 3A illustrates two wafer substrates W1 and W2 in which the positions of the respective lenses L with respect to the alignment marks are deviated from each other. FIG. 3B shows a plan view when these wafer substrates W1 and W2 are bonded to each other with the spacer S interposed therebetween in view of the calculation result by the lens substrate stacking position calculating apparatus 100. FIG. 3C shows a cross-sectional view taken along line A-A in FIG. 3B.

As can be seen from the drawing 3C, although there is an optical axis deviation for each pair of lenses in this example, the respective amounts of optical axis deviation can be kept within the allowable ranges, thereby improving the yield of products.

In the lens substrate stacking position calculating apparatus 100 of the present invention, when three-dimensional shape data of a predetermined range of the surface of each lens L is prepared in advance for each wafer substrate W to be bonded, the shape measuring unit 110 is unnecessary. When the position of each lens L in the same coordinate system is specified in advance for each wafer substrate W to be bonded, the shape measuring unit 110 and the lens position specifying unit 120 are unnecessary.

The lens position specifying unit 120 and the positional relationship calculating unit 130 in the lens substrate stacking position calculating apparatus 100 of the present invention may be realized by a computer which executes a program in which the functions of these units are described. More specifically, the present invention can be realized by storing a program in an arbitrary storage means, reading the program into a CPU, and executing the program.

The present invention is not limited to the above embodiments. Each embodiment is exemplified, and any embodiment having substantially the same constitution as the technical idea described in the claims of the present invention and exhibiting the same operation and effect is included in the technical scope of the present invention. That is, the present invention can be suitably modified within the scope of the technical idea expressed in the present invention, and forms to which such modifications and improvements are added are also included in the technical scope of the present invention.

What is claimed is:

1. A lens substrate stacking position calculating apparatus for calculating a positional relationship of two or more transparent substrates to be stacked when two or more transparent substrates on which a plurality of lenses are two-dimensionally arranged are stacked to form a plurality of lens set each including two or more lenses,
   wherein a position of each lens is specified in advance in a common coordinate system, and
   wherein the lens substrate stacking position calculating apparatus comprising:
   a positional relationship calculating unit for calculating a relative positional relationship between two or more transparent substrates that maximizes the number of lens sets in which the magnitude of the positional deviation between the lenses constituting the lens set falls within a predetermined range by a predetermined calculation method; and
   a lens position specifying unit for specifying the position of each lens based on three-dimensional shape data of a predetermined range of the lens surface,
   wherein the lens position specifying unit fits a predetermined three-dimensional model to the three-dimensional shape data, and specifies a two-dimensional coordinate of a predetermined center point of the three-dimensional model after fitting in the common coordinate system as the position of the lens on the transparent substrate.

2. The lens substrate stacking position calculating apparatus as claimed in claim 1, wherein the common coordinate system is a two-dimensional coordinate system commonly defined for each of the transparent substrates.

3. The lens substrate stacking position calculating apparatus as claimed in claim 2, wherein the two-dimensional coordinate system is defined based on an alignment mark provided on each of the transparent substrates.

4. The lens substrate stacking position calculating apparatus as claimed in claim 1, wherein the relative positional relationship is an amount shifted in each of the rotational direction and the translational direction.

5. The lens substrate stacking position calculating apparatus as claimed in claim 4, wherein the predetermined calculating method is based on a random search method or a RANSAC method.

6. The lens substrate stacking position calculating apparatus according to claim 1, wherein the predetermined three-dimensional model is a sphere, and the predetermined center point is calculated based on an equation of a spherical surface.

7. The lens substrate stacking position calculating apparatus according to claim 1, wherein the predetermined three-dimensional model is design data of the lens, and the predetermined center point is calculated based on a calculation formula based on the design data.

8. The lens substrate stacking position calculating apparatus according to claim 1, further comprising a shape measuring unit for measuring the three-dimensional shape data.

9. A lens substrate stacking position calculating apparatus for calculating a positional relationship of two or more transparent substrates to be stacked when two or more transparent substrates on which a plurality of lenses are two-dimensionally arranged are stacked to form a plurality of lens set each including two or more lenses,
   wherein a position of each lens is specified in advance in a common coordinate system, and
   wherein the lens substrate stacking position calculating apparatus comprising:
   a positional relationship calculating unit for calculating a relative positional relationship between two or more transparent substrates in which the number of lens sets in which the magnitude of the positional deviation between the lenses constituting the lens set falls within a predetermined range is larger than a predetermined number by a predetermined calculating method; and
   a lens position specifying unit for specifying the position of each lens based on three-dimensional shape data of a predetermined range of the lens surface,
   wherein the lens position specifying unit fits a predetermined three-dimensional model to the three-dimensional shape data, and specifies a two-dimensional coordinate of a predetermined center point of the three-dimensional model after fitting in the common coordinate system as the position of the lens on the transparent substrate.

10. The lens substrate stacking position calculating apparatus as claimed in claim 9, wherein the common coordinate system is a two-dimensional coordinate system commonly defined for each of the transparent substrates.

11. The lens substrate stacking position calculating apparatus as claimed in claim 10, wherein the two-dimensional coordinate system is defined based on an alignment mark provided on each of the transparent substrates.

12. The lens substrate stacking position calculating apparatus as claimed in claim 9, wherein the relative positional relationship is an amount shifted in each of the rotational direction and the translational direction.

13. The lens substrate stacking position calculating apparatus as claimed in claim 12, wherein the predetermined calculating method is based on a random search method or a RANSAC method.

14. The lens substrate stacking position calculating apparatus according to claim 9, wherein the predetermined three-dimensional model is a sphere, and the predetermined center point is calculated based on an equation of a spherical surface.

15. The lens substrate stacking position calculating apparatus according to claim 9, wherein the predetermined three-dimensional model is design data of the lens, and the predetermined center point is calculated based on a calculation formula based on the design data.

16. The lens substrate stacking position calculating apparatus according to claim 9, further comprising a shape measuring unit for measuring the three-dimensional shape data.

\* \* \* \* \*